United States Patent [19]

Toms, Jr.

[11] Patent Number: 4,997,171
[45] Date of Patent: Mar. 5, 1991

[54] HEAVY OFF-ROAD LARGE VEHICLE SUSPENSION STRUT

[75] Inventor: Robert S. Toms, Jr., Warrenville, Ill.

[73] Assignee: Miner Elastomer Products Corporation, Geneva, Ill.

[21] Appl. No.: 450,946

[22] Filed: Dec. 15, 1989

[51] Int. Cl.$^5$ .............................................. F16F 1/34
[52] U.S. Cl. .................................... 267/294; 267/70; 267/141.1
[58] Field of Search ............. 267/70, 141, 141.1, 267/141.2, 141.4, 141.5, 153, 162, 292, 294

[56] References Cited

U.S. PATENT DOCUMENTS

| | | | |
|---|---|---|---|
| 2,245,295 | 6/1941 | Piron | 267/141 X |
| 2,639,141 | 5/1953 | Gabriel | 267/294 X |
| 2,716,566 | 8/1955 | Thiry | 267/153 X |
| 2,893,722 | 7/1959 | Beck | 267/141 X |
| 3,756,551 | 9/1973 | Bishop | 267/141.1 |
| 3,831,923 | 8/1974 | Meldrum | 267/141 |
| 4,198,037 | 4/1980 | Anderson | 267/153 |
| 4,756,512 | 7/1988 | Toms, Jr. | 267/70 |

Primary Examiner—Duane A. Reger

[57] ABSTRACT

A shock absorber strut that includes inner and outer tubes which slide one over the other in a telescopic relationship. In the space confined between closed ends of the tubes, a stack arrangement of compressible elastomeric material pad assemblies is provided to function as shock absorber medium. Each assembly has a pad of compressible material having a central opening, a metal plate having a corresponding central opening and abutting one end of the pad, and a flanged bearing through said openings and abutting the plate to the pad. The pad has ends provided with a series of different sized bores cooperating to define flow spaces for compressed elastomer material to avoid contact with the guide rod. A guide rod extends substantially through the strut through the bearings. The entire arrangement of the bearing provides a glide path for the guide rod. Each plate has a plurality of holes, sub-peripherally located, the holes having torn and jagged protrusions engageable with the pad end.

1 Claim, 2 Drawing Sheets

HEAVY OFF-ROAD LARGE VEHICLE SUSPENSION STRUT

BACKGROUND OF THE INVENTION

1. Field of the Invention

This invention relates to shock absorber struts, and more particularly to a very large heavy strut means wherein inner and outer assemblies can rotate independently in at least two different directions.

2. Description of the Prior Art

Heavy off-road haulage trucks, which are designed to carry loads in the range of from 35 to 220 tons over rough terrain, are designed to employ some sort of shock absorber strut means. Such strut means are massive in size, for example, a strut means for a 150 ton hauler weighs in the range of 1,100 to 1,200 lbs. and is approximately 7½ ft. long and 14 inches in diameter. A substantial number of such struts employ hydraulic principles to absorb the shock. Characteristically, they leak and require frequent servicing. Invariably they must be removed entirely from the vehicle and taken to a repair shop, for example, for servicing, which, as appreciated because of their size, is very difficult. The present inventor, in an earlier development, as described in U.S. Pat. No. 4,756,512, issued July 12, 1988, to Robert S. Toms, Jr., overcame the deficiencies associated with struts employing hydraulic principles by designing a suspension strut using elastomer material pads assembled in stacks, as sold by Miner Enterprises, Inc., of Geneva, Illinois, under the trade name "TecsPak", and more fully described in U.S. Pat. No. 4,198,037, issued Apr. 15, 1980, to Anderson. The strut assembly comprises a pair of telescoped tubes housing therein a stack of pads, each having a central opening for admitting a steel guide rod. The pads are separated from each other by intervening steel plates. It has been determined that occasionally, the suspension strut, when subjected to compression, will compress the elastomer material to such an extent that the size of the central openings in some of the pads will be decreased by the flow of the elastomer material, which then applies a compressive force to the guide rod, thereby rendering it less effective in providing a cushioning force. Furthermore, such gripping of the guide rod by the pads causes wear in the pads by enlargement of the central openings to such an extent that the guide rod loses its function of maintaining the pads concentrically in the telescoped tubes.

It is, therefore, a prime objective of the present invention to provide shock absorber strut means using pads which are not subjected to mechanical deterioration as the pads move along the guide rod.

Another object of the invention is to use a pad assembly comprising a pad made from resilient material, a steel plate, and a bearing, all arranged as a single unit and substantially isolating the resilient material from contacting the guide rod.

A further object of the invention is to provide an assembly of two different types of pad assemblies in a shock absorber strut to provide a predetermined amount of damping.

SUMMARY OF THE INVENTION

The shock absorber unit of this invention includes an outer tube which has slidably carried therein partially an inner tube. The first ends of both tubes are open while both second ends are closed and terminate in an upper clevis and a lower clevis. Adjacent the open end of the inner tube is a first bearing means while adjacent the end of the outer tube is positioned a second bearing means whereby the two tubes can slide with respect to each other. The enclosed space formed by the overlap of the tubes is filled with a pad stack of a compressible solid material.

In practice, the enclosed space is filled with a pad stack of elastomeric material pads separated by steel plates, the pads and the steel plates having central openings which are coaxial with each other, and a guide rod being secured to the outer tube assembly and running through the center of the stack to achieve alignment and stability. To facilitate smooth movement of the pad assembly along the guide rod, each of the pads and associated steel plates is provided with a bearing which is long enough to isolate the elastomeric material of the pad from contacting the guide rod.

The bearing insert is primarily designed to alleviate three problems encountered with suspension struts and other devices designed to absorb impact energy. Energy absorption is handled with the use of elastomer pads configured to operate as a spring/damper system. In such devices, up to 30 elastomer pads, separated by steel plates, are aligned and guided by a center guide rod. The entire stack of 30 pads and plates operate within two telescoping tubes which contain the center guide rod. The elastomer pads and plates have inner diameters (ID) such that they ride up and down the guide rod and remain in-line.

The first of these problems arises as soon as these elastomer pads are compressed during their operation. During the compression, the ID of each pad is reduced by the flow of the compressed elastomer and the pad grips the guide rod. As the suspension strut compresses, the elastomer pads increase their grip on the guide rod. The resultant of this condition is that the impact loads are transferred directly to the guide rod and, therefore, into the truck chassis In this case of guide rod gripping, the bearing provides an independent load bearing surface for the pad ID's to grip on. The cylindrical surface of the bearing takes up the radial pad loads, while still providing smooth linear motion along the guide rod. By reducing the load applied to the guide rod the elastomer pads are able to efficiently control the energy absorption as designed.

Tests run on pad stacks with and without the bearings reflected the reduction in guide rod gripping. Of pad stacks that were calibrated, cycled and recalibrated, the pad stack with the bearings reduced guide rod loads by 69% at full compression.

The second problem encountered with such suspension struts is concerned with the end of the guide rod. The construction of such suspension struts requires a number of elastomer pads to be unguided by the guide rod during its operation. During operation, these unguided pads, usually 7 or 8 in number, compress and reduce their ID. With no restriction on the amount of reduction, their ID's are reduced much smaller than the OD of the guide rod. As the suspension strut is compressed, the guide rod is forced to wedge and pierce its way through these pads. This condition, like the guide rod gripping, also transfers suspension loads directly to the guide rod and, therefore, into the truck chassis. This condition also is responsible for causing damage to the guide rod.

The bearings provide an unrestricted and aligned channel for the entry of the guide rod end. By not allowing the elastomer pads to close their ID's, the guide rod travels through each bearing surface and never contacts the pads.

Uncertain stability and alignment of these unguided pads and plates make it difficult for the guide rod end to travel coaxially through the openings. The present pad assembly shows how each bearing is pressed into each plate and adjacent pad, making all three an integral assembly. This is a key design feature as it always guarantees perfect concentricity of the bearing ID, the pad ID and the plate ID. This feature makes it possible to keep the bearing ID centered in the strut, by centering the plate. By closely matching the plate OD to the ID of the suspension strut housing, each bearing is also centered. Therefore, in the unguided rod region, the bearings are centered and in-line with the guide rod.

The third and final feature of the bearing involves the improvement of the pad/plate/bearing alignment. As an integral assembly, there is no means for misalignment or shifting of these items during operation. This is equally important during the construction phase of the entire pad stack assembly where misalignment can occur during the assembling of the pad stack.

Previously, suspension strut pads had their ID bored about ¼' larger than the guide rod OD. The theory was to provide initial clearance for each pad ID to reduce, during compression, the gripping of the guide rod. This clearance, however, allowed each pad to shift up to ⅛' in any direction. With each pad finding its own natural direction of shift, severe skewing of the entire pad stack occurred. Once this skewing took place, the entire pad stack began to deform and bind on the guide rod. This condition led to the bending of high tensile strength steel guide rods. At this point, the suspension strut became completely ineffective.

DESCRIPTION OF THE PREFERRED EMBODIMENT

Figure 1:
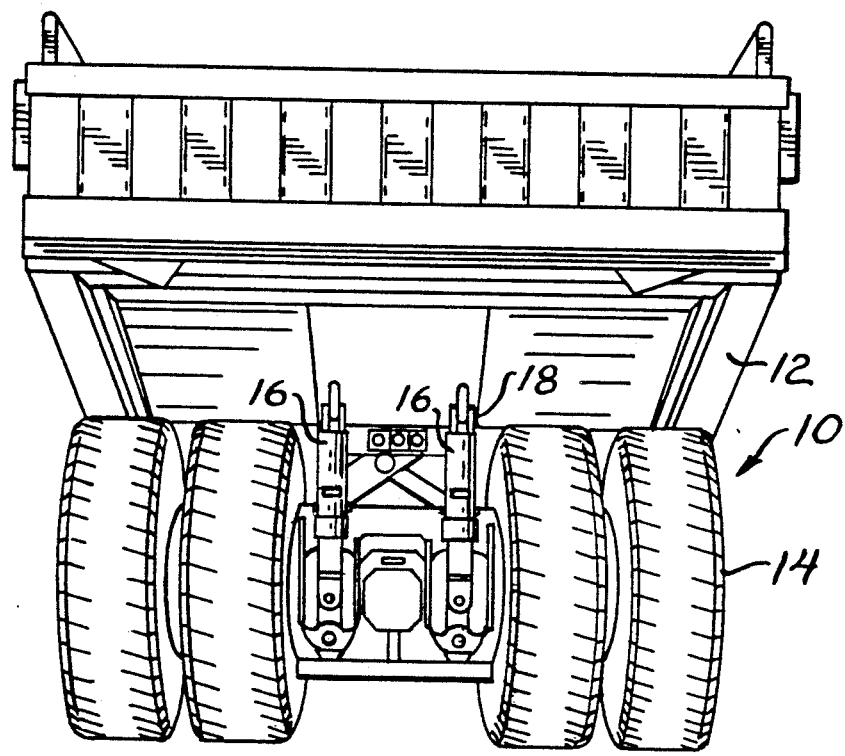
FIG. 1 is a rear view of a heavy off-road truck showing the shock absorber strut means with an upper clevis secured to the main frame of the truck and the lower clevis secured to the axle system.
Figure 2:
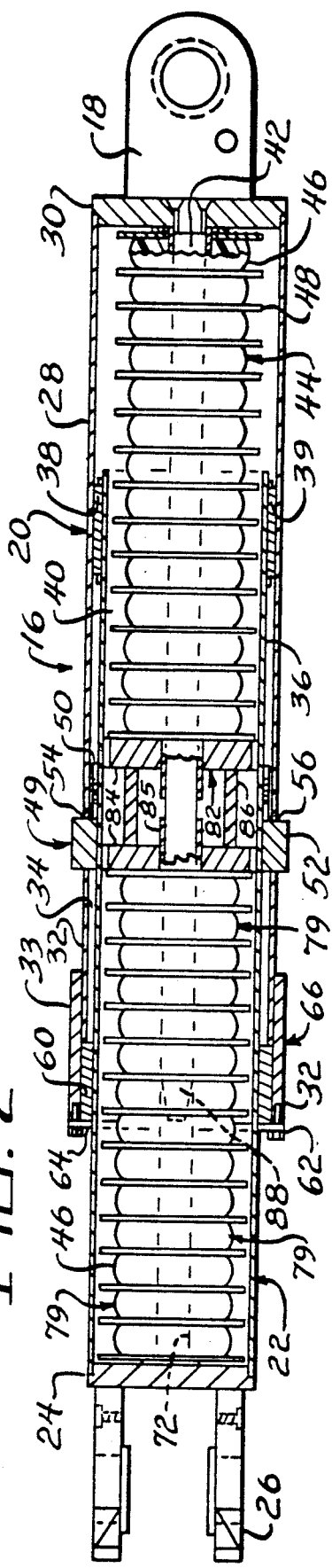
FIG. 2 is a cross-sectional view of the shock absorber strut means.

Referring to the drawings, and particularly to FIGS. 1 and 2, there is shown the rear of a heavy truck 10. For the sake of simplicity, the truck will essentially be considered to consist of two main groups of components. The first is main frame means 12, which include generally the frame, the cab, the engine, etc., and the axle means 14, which include the axles, tires, differential, etc. Normally, between these two main groups of components are shock absorber strut means 16. It should be understood that there are two shock absorber strut means in the front of the truck, as well as two in the rear. For all practical purposes, all four struts are essentially the same, and, therefore, discussion will be limited to one strut, with the understanding that it applies equally well to all struts. In actual operation, the upper clevis means 18 is pivotally secured to the main frame means 10. The upper clevis means 18 is a part of the outer tube assembly 20 that slidingly receives the inner tube assembly 22. At the first end means 24 of the inner tube 22 is connected a lower clevis means 26 which, in turn, is connected to the axle system 14. Any suitable connection means can be employed, and in the embodiment shown, a pin is employed for the connection.

Returning now to a consideration of FIG. 2, a description of the actual shock absorber strut means 16 will be undertaken. As shown, and as previously described, the strut means 16 includes an outer tube assembly 20, which has a generally cylindrical body portion means 28, first and second end means 30 and 32. The upper or first end means 30 is sealed and carries the upper clevis 18, while carried off the second end 32 is a lower bearing housing means 33. It generally encircles said inner tube assembly means 22 while providing a predetermined gap 34 therebetween. The inner tube assembly means 22 includes a cylindrical body portion means 36 having a first open end means 38 provided with a tacked-on bearing sleeve 39 and a second closed end means 24. As previously stated, the second closed end means 24 is secured and carries the lower clevis end means 26. The inner and outer tube assembly means 20, 22, slidably fit one within the other, thereby defining a closed space 40 therebetween. A center guide rod means 42 is secured to the first end 30 of the outer tube assembly 28 and extends generally along the major axis of the strut means 16 through the enclosed space 40 terminating at a point away from the first end means 24 of said inner tube assembly 22. A compression material pad stack means 44 containing spaced bearings 74 is journaled by the center guide rod 42 through its entire height and substantially fills the enclosed space 40. As previously indicated, the pad stack means 44 in the preferred embodiment is an elastomer compression spring sold under the Trademark "TecsPak" and consists of alternate layers of elastomer material 46 and steel plates 48.

In the final assembled shock absorber strut, the pad stack 44 is subjected to a preload. In order to facilitate the preloading, as well as achieve a number of other desirable features, a keeper ring means 50, for example, a steel ring which fits all around the inner tube means 22 and is afixedly secured thereto by appropriate means. The exact location of the keeper ring means 50 on the inner tube means 22 is dictated by a series of aperture means 54 located in the surface of the outer tube assembly means 28. The aperture means 54 are designed to receive a bearing surface means 49, which is actually a key stop means 52, which is inserted into the aperture means while the strut is in a compressed state to achieve a desired preload and welded in place. The key stop means 52 and the keeper ring means 50 cooperate such that a bearing surface means 56 is created therebetween. As is apparent, the inner tube assembly can move along a major axis of the strut with respect to the outer tube assembly, or vice versa, and each tube assembly can rotate in a different direction as well because of the provision of the bearing surface 56. An additional feature of the key stop 52 and keeper ring means 50 is the proper dimensioning with respect to the outer tube 20. It creates a first seal means 58 to prevent the passage of dirt and abrasives to the open end means 38, as well as to the elastomer pad stack means 44. As previously noted, carried off the end means 32 of the outer tube assembly means 20 is the lower bearing housing means 33, being secured thereto by any suitable means. As a result of this cooperation, a predetermined gap 34 is created having particular dimensions and characteristics to receive a lower bearing ring means 60. In practice, once the lower bearing ring means 60 has been placed into the gap 34, a retainer plate means 62 is fastened to the bottom 64 of the lower bearing housing means 33. Any suitable means may be employed to accomplish the physical juncture. It should be noted that the lower clevis 26, the end means 24, and the inner tube assembly means 22 have been dimensioned such that a lower bearing ring means and retainer plate means 62 can be slipped on and off therefrom. This allows a quick and simple efficient replacement of the lower bearing ring means 60, since it floats in the gap means 34. Additionally, the assemblage consisting of the lower bearing ring means 60, the retainer plate means 62, and the lower bearing housing means 33 constitute a second sealing means 66 which cooperates with the first sealing means 58 to prevent the passage of contaminates into the closed space means 40.

Figure 3:
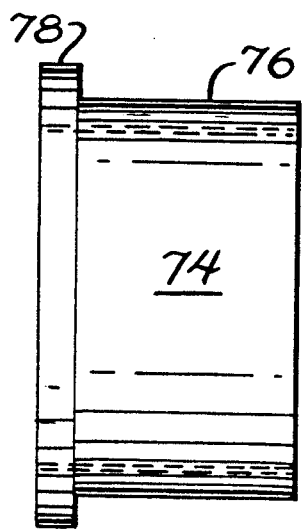
FIG. 3 is a side view of a bearing.
Figure 4:
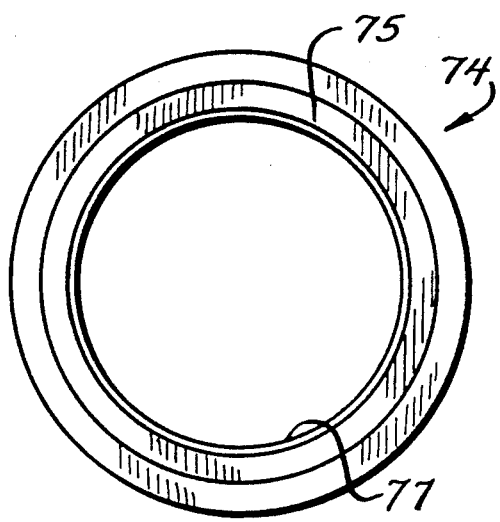
FIG. 4 is a plan view of the bearing.
Figure 5:
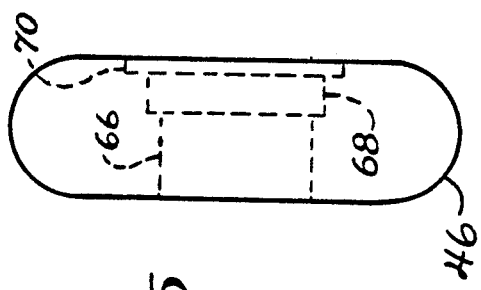
FIG. 5 is an end view of a pad showing internal space configuration.
Figure 6:
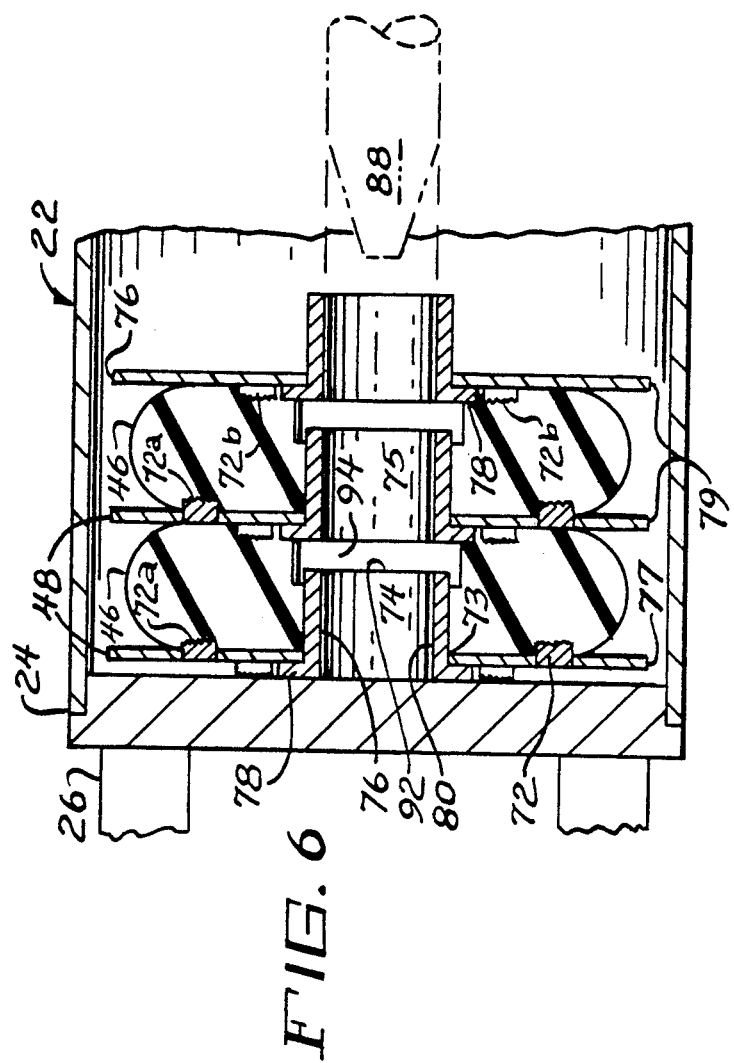
FIG. 6 is an enlarged cross-sectional view of the left side of the shock absorber strut means illustrated in FIG. 2.

Referring to FIGS. 5 and 6, the elastomer material pad 46 possesses a donut-like configuration having a number of interconnecting bores 66, 68, and 70. The compression material pad stack means 44 comprises a number of the elastomer material pads 46, as particularly shown in the enlarged view of FIG. 6, wherein each of the pads 46 is associated with the steel plate 48 which has a plurality of openings 72 equally spaced along a circumference located between its inner diameter 73 and its outer diameter 77. In this particular embodiment, there are eight openings 72. Four of the openings 72a being punched outwardly to the right of the plate 48, and four openings 72b being punched out to the left of the plate 48. The holes are punched out so as to possess a rough serrated or jagged outline to firmly penetrate into the body of the abutting pad 46. Each pad 46 is associated with a bearing 74 which has a shank 76 which is adapted to be inserted into the bore 66, the bearing 74 having a flange 78 which abuts its associated steel plate 48. An inner diameter 80 of the bearing 74 is coaxial with the bore 66 of the pad 46. The combination of the pad 46, the plate 48, and the bearing 74 define a pad assembly 79, wherein the shank 76 of the bearing 74 is securely installed in the bore 66 of the pad 46 and the flange 78 of the bearing 74 forces the plate 48 and its punched-out jagged holes 72a against the pad 46 to form an integral unit. The shank 76 of the bearing 74 extends through the entire bore 66 and ends at the beginning of the bore 68. The construction of the bearing 74 is best viewed in FIGS. 3 and 4. The bearing 74 has an inner surface 75 provided with a layer of Teflon (TM) or other suitable material to facilitate the gliding of the guide rod 42 therethrough.

As best seen in FIG. 2, the pad stack means 44 comprises, in this particular embodiment, a first stack of fourteen pad assemblies 79 abutting each other and extending from the end means 30 up to a guide rod alignment bearing 82 which is in the form of a ring having a pair of spaced circular walls 84 secured to each other by a wall 86. The circular walls 84 are provided with bearing sleeves 85 which admit the guide rod 42. On the other side of the guide rod alignment bearing 82, there is another stack of abutting pad assemblies 79 which extend to and abut the first end means 24. The guide rod 42 has a conical free end 88 and subtends through three-fourths of the pad stack means 44. As seen at the left side of FIG. 2, there are seven pad assemblies 79 which, upon application of compression to the inner tube assembly 22, will be compressed and engage with the guide rod 42, which maintains the pad assemblies 79 in alignment with the other pad assemblies.

Referring to FIG. 5, the pad 46 has a bore 68 providing flow (void) space 94 to accommodate the flow of the elastomer material subjected to compression, the flow of the elastomer material, under compression, is eliminated around the portions of 15 the guide rod means 42 in the area between shank end 92 of the bearing 74 and the flange 78 of the next adjacent bearing 75, as shown in FIG. 6.

Although all of the pads 46 shown in the present embodiment are associated with a bearing 74, it is quite possible to remove one or more of the bearings to provide variable damping, whereby the compressed elastomer material in the pads having no bearing will flow inwardly to apply a compressive force on the periphery of the guide rod 42.

To reduce oscillation, one or more pad assemblies 79 may be removed and replaced by a modified pad assembly which has no bearing 74. In other words, the modified pad assembly will possess only the steel plate 48 and the elastomer material pad 46. When the modified shock absorber strut is subjected to compression, the ID of each pad of the modified pad assembly is reduced by the flow of the compressed elastomer, and the pad grips the guide rod 42. As a result of this condition, the impact load applied to the vehicle is transferred directly to the guide rod to provide a damping effect.

Having described the invention in detail and with sufficient particularity as to enable those skilled in the art to practice it, what is desired to have protected by Letters Patent is set forth in the following claims.

What is claimed is:

1. A shock absorber strut means secured to the body of a heavy offroad haulage vehicle, comprising:
    an outer tube assembly means including:
    a generally cylindrical body portion means having first and second end means, and having at least two aperture means located in said cylindrical body portion means, said first end means having an upper clevis end means which is pivotally secured to said body of said vehicle, said second end means being open;
    an inner tube assembly means including;
    a generally cylindrical body portion means having first and second end means, said first ends means having a lower clevis end means and said second end means being open, said inner tube assembly means being slidably fitted within said outer tube assembly means;
    a center guide rod means, secured to said first end means of said cylindrical body portion means of said tube assembly means whereby said center guide rod means extends generally down the center of said outer tube assembly means and said inner tube assembly means terminating at a point away from said first end means;
    a compressible material means journaled by said center guide rod means and partially filling the enclosed space created by said inner and outer tube assembly means, said compressible material means being subjected to a preload;

a keeper ring means secured to and encircling said inner tube assembly means and dimensioned with respect to said outer tube assembly to create a first seal means;

key stop means removably secured in said aperture means of said outer tube assembly means in an abutting relationship with said keeper ring means whereby a bearing surface is created therebetween such that the inner tube assembly means is locked within said outer tube assembly means so that movement along and around the major axis of the shock absorber means can take place therebetween and said enclosed space is generally sealed;

an upper bearing ring means encircling said second end means of said inner tube assembly means and being secured thereto;

a lower bearing ring means encircling said inner tube assembly means adjacent said first end means; and a lower bearing housing means secured to said second end means of said outer tube assembly means thereby encircling said lower bearing ring means;

the improvement wherein:

said compressible material means comprises a plurality of round-like pads wherein each pad is provided with several bores having different diameters;

a bearing means being provided an entry by the smallest of said bores, the remaining bore providing a void to accept the flow of the compressed material, each round-like pad having a central opening, at least one metal plate, having a central opening being secured to one of the ends of the pad, said bearing protruding through said central opening and having a flange abutting the metal plate to secure said plate to said pad, said bearing extending substantially into said pad, whereby said bearing isolates the compressible material during compression of the strut means, from flowing and contacting the guide rod means.

* * * * *